May 26, 1970 C. E. WIESNER ET AL 3,513,700
METERING APPARATUS
Filed Aug. 16, 1967 2 Sheets-Sheet 1

INVENTOR.
CHARLES E. WIESNER
WALLACE D. WIESNER
BY Merchant & Gould
ATTORNEYS

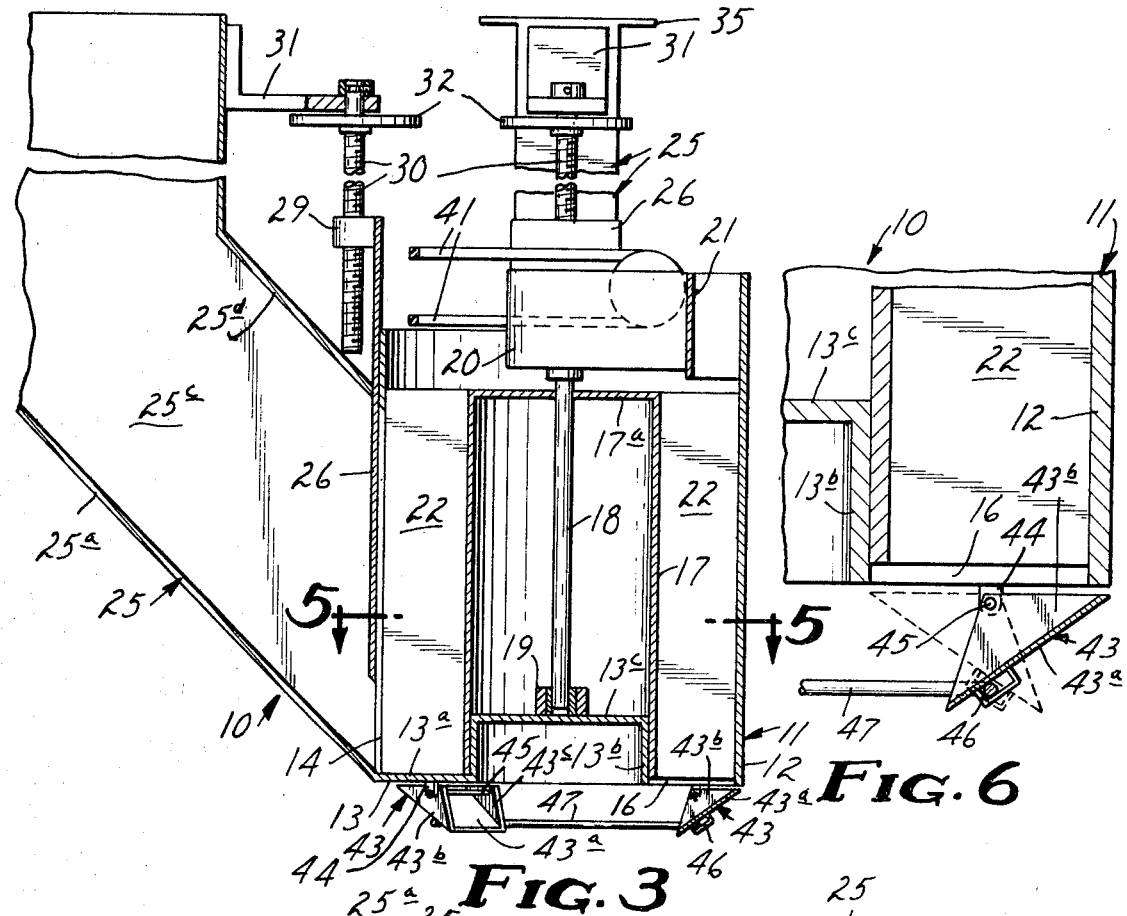
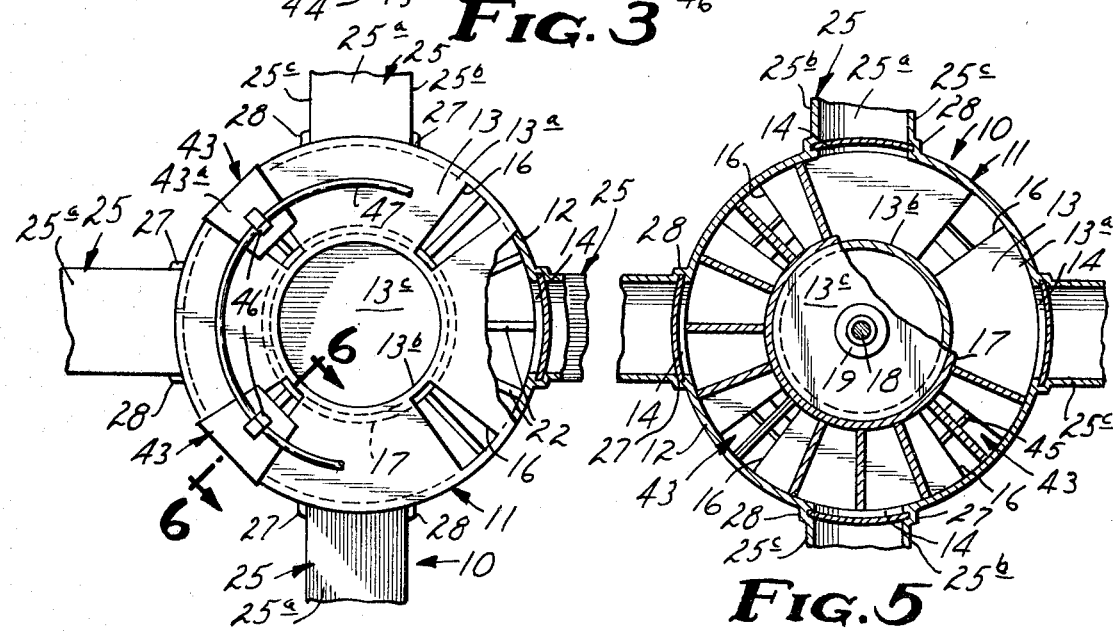

United States Patent Office 3,513,700
Patented May 26, 1970

3,513,700
METERING APPARATUS
Charles E. Wiesner and Wallace D. Wiesner, both of 517 7th St., Brookings, S. Dak. 57006
Filed Aug. 16, 1967, Ser. No. 661,034
Int. Cl. G01f 1/08
U.S. Cl. 73—219
10 Claims

ABSTRACT OF THE DISCLOSURE

Apparatus for metering a flow of material from each of a plurality of sources of a comminuted material such as fertilizer to obtain a single batch of material comprising selected proportions of the original source materials. The original source materials are introduced into equally spaced openings formed in the side wall of a cylindrical housing disposed about a vertical axis. A paddle wheel unit coaxially mounted in the housing for rotation about the vertical axis carries the material from each side wall opening to one of a plurality of bottom wall openings in the housing. Each bottom wall opening is located midway between an adjacent pair of side wall openings. The paddles on the paddle wheel unit are mounted closer together than the distance between adjacent side and bottom openings to prevent leakage therebetween.

BACKGROUND OF THE INVENTION

Field of the invention

This invention relates generally to apparatus for metering the flow of comminuted materials, and more particularly relates to a device for metering differing amounts of different grades of fertilizer from a plurality of sources to obtain a single batch of fertilizer having a desired composition.

Description of the prior art

In the agricultural industry today, vast amounts of fertilizer are used to maintain or increase crop yields. Typically, fertilizer is added to the soil either before or during the growing season to replace deficient elements in the soil or to add an excess of certain elements that are known to benefit the growth of certain crops. Chemical fertilizers are available either in granular or liquid form, although the use of granular type fertilizer is more prevalent. The term "granular" is meant to include materials ranging in size from finely divided, powder-like materials to larger, more discrete particles or granules.

Commerical fertilizers normally contain one or more of the basic elements, nitrogen, phosphorus and potash as well as minor amounts of various trace elements. The percentage of each element in the mixture is known so that a correct amount of each element can be applied to the soil. In addition to adding these basic elements, it is often necessary to add soil conditioners to control other properties of the soil. For example, lime or gypsum is often added to control the acidity of the soil. All of these materials are available commercially in granular form.

Before commerical fertilizer is added to the soil, it is usually necessary to conduct some type of investigation to determine what materials are required. A chemical test of the soil can be conducted to determine what elements are in short supply. In addition, if a particular crop is to be grown that requires large amounts of certain elements, excess amounts of these elements can be applied to the soil to promote rapid growth of the crop. Testing may also reveal that the soil is too high or too low in acid content, causing certain elements to be locked in the soil and made unavailable for use by the growing crop.

Adding the correct amount of each element to the soil is very important. If an insufficient amount of a deficient element is added, the desired crop yields will not be achieved. If unneeded elements are added or if too large a quantity of a particular element is added, crop damage can result. In any event, the addition of unneeded fertilizer is a wasteful practice since fertilizer is relatively expensive.

Since all of the fertilizer necessary for a particular field is usually added in a single operation, the fertilizer that is added must be a mixture of the needed elements, in the proper proportions. In order to provide each customer with the mixture best suited to his operation, commercial distributors of fertilizer usually maintain large stocks of unmixed or basic fertilizer material. These basic materials are then blended together in the proper amounts to meet the customers requirements.

The farmer himself may also desire to maintain stocks of the basic fertilizers so that he can mix them together in differing proportions for different fields or different crops. Regardless of who does the blending, some means of quickly and accurately blending together the correct proportions of the several basic ingredients is necessary. The process of measuring or weighing each ingredient separately and then bringing them together for mixing is too slow a process, especially where large amounts of materials are used. The prior art has not provided a simple and effective apparatus for continuously blending together selected amounts of differing grades of fertilizer to obtain a fertilizer mixture containing the desired elements in the desired proportions.

SUMMARY OF THE INVENTION

The present invention provides apparatus for blending together selected amounts of differing grades of fertilizer from differing sources to obtain a single mixture or blend with the desired properties. The apparatus operates on a continuous flow basis so that large amounts of material can be handled in a short time. The amount of each basic material being added to the mixture can be quickly and accurately adjusted to regulate the composition of the final mixture. These adjustments can be made while the apparatus is operating and means are provided to quickly test the results of the adjustments.

The present invention has many uses in addition to its use in the blending of fertilizers. For example, various grades of wheat or other grains may be mixed together to obtain a desired blend. Different feed grains, such as corn, oats, and barley can be blended together in the proper proportions for animal feed purposes. Further, it can be used to blend together such materials as granular herbicides or insecticides. Basically, the present invention can be used to blend together selected amounts of comminuted materials to obtain a final blend containing each source material in the desired proportion.

BRIEF DESCRIPTION OF THE DRAWINGS

FIG. 3 is an enlarged sectional view taken along line 3—3 of FIG. 2;

FIG. 4 is a bottom plan view of the metering apparatus, some parts thereof being broken away and some parts being shown in section;

FIG. 5 is a sectional view taken along line 5—5 of FIG. 3; and

FIG. 6 is an enlarged sectional view taken along line 6—6 of FIG. 4.

DESCRIPTION OF THE PREFERRED EMBODIMENT

Figure 1:
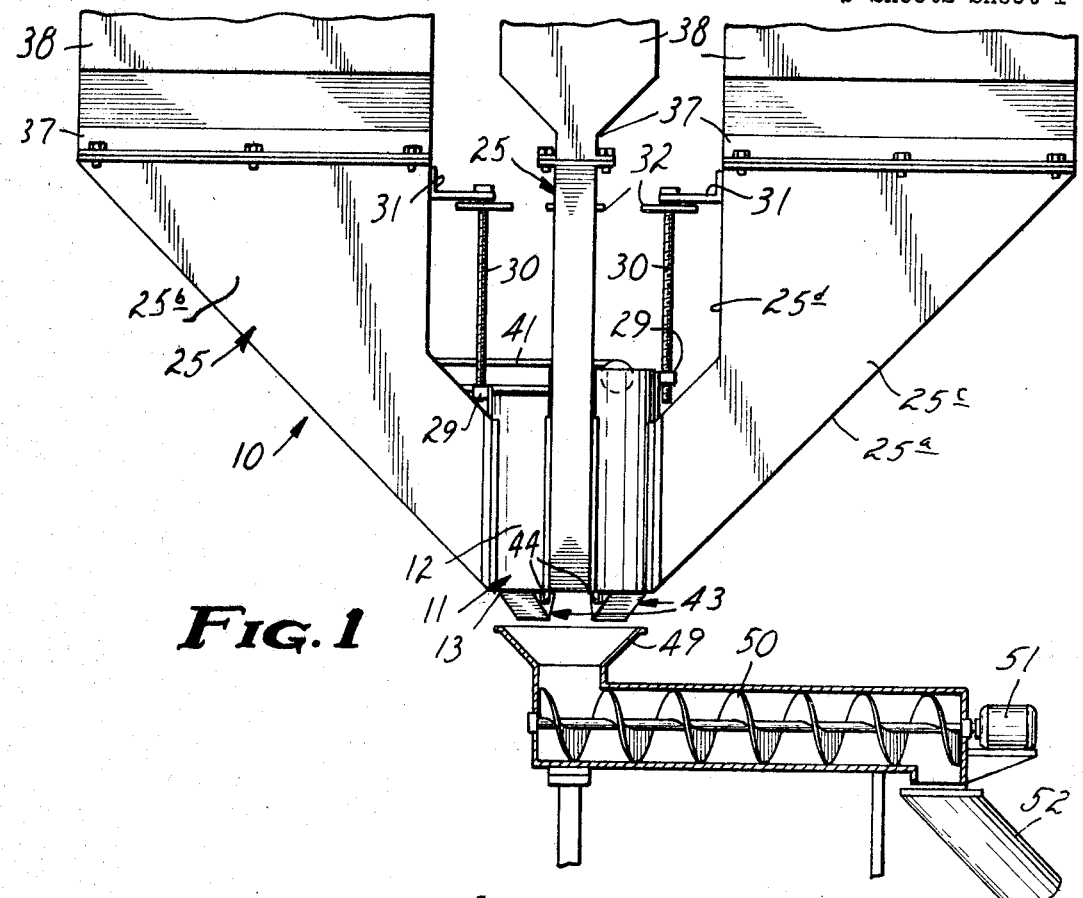
FIG. 1 is a side elevational view of a metering apparatus constructed in accordance with my invention, portions thereof being broken away and shown in section.
Figure 2:
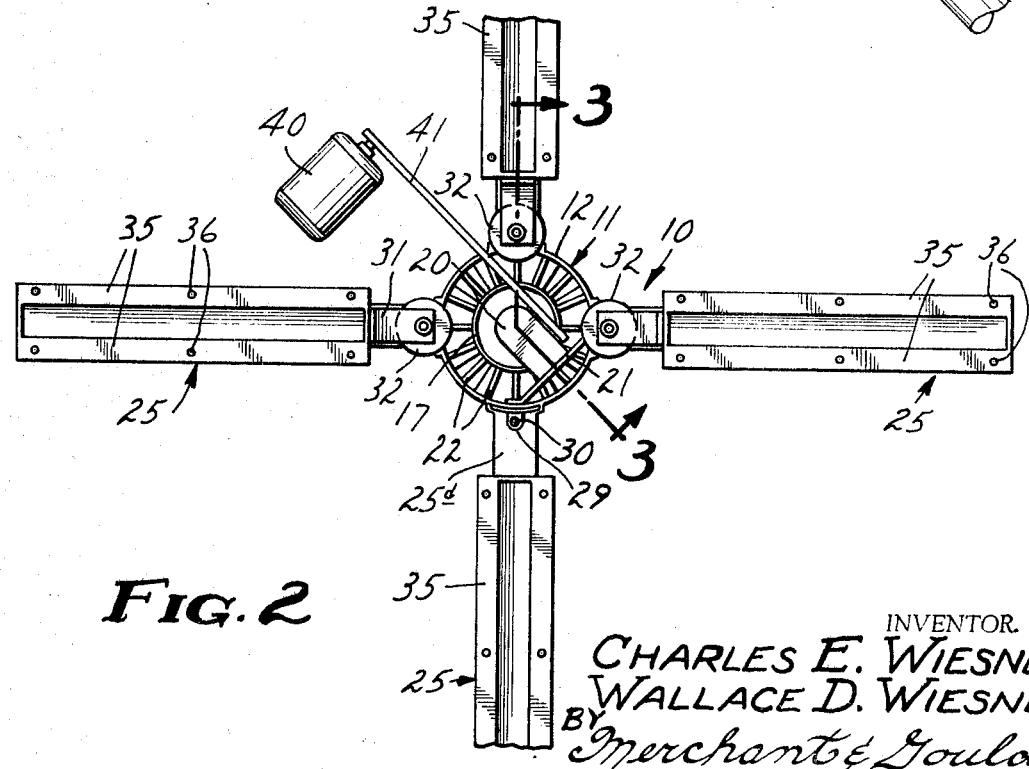
FIG. 2 is a top plan view of FIG. 1, some parts of FIG. 1 not being shown.

Referring now to the drawings, wherein like reference numerals are used throughout the several views to indicate like parts of the apparatus, there is disclosed a fertilizer metering and blending apparatus 10. Metering apparatus 10 includes a housing 11 that in the preferred embodiment has the configuration of a right circular cylinder disposed symmetrically about a vertical axis. Housing 11 includes a continuous side wall 12 having a circular cross section and a bottom wall 13. Bottom wall 13 comprises an annular, horizontally positioned outer portion 13a connected at its outer periphery to side wall 12. Connected to the inner periphery of outer portion 13a is a cylindrical member 13b having a vertically disposed side wall with a circular cross section extending upwardly from outer portion 13a. Connected across the top of cylindrical member 13b is a flat, circular center portion 13c. The axis of cylindrical housing 11 extends through the center of center portion 13c.

Formed in side wall 12 are a plurality of evenly spaced openings 14. Each opening 14 has a rectangular configuration with vertically extending side edges and horizontally extending top and bottom edges. Each opening 14 extends upwardly from bottom wall 13 to a point near the upper edge of housing 11. In the preferred embodiment of our invention, shown in the drawings, four such openings 14 are formed at equally spaced intervals in side wall 12.

A like plurality of openings 16 are formed in outer portion 13a of bottom wall 13. Openings 16 are equal in number to openings 14 and each is positioned midway between a pair of adjacent openings 14 in side wall 12. Therefore, openings 14 and 16 are alternately and successively positioned around the periphery of housing 11. Each opening 16 has a pair of side edges that lie in planes extending through the vertical axis of housing 11. Each opening 16 also has an inner edge adjacent cylindrical member 13b and an outer edge adjacent side wall 12. It is noted at this point that the vertical side edges of openings 14 in side wall 12 also lie generally in planes extending through the vertical axis of housing 11.

Each opening 14 has the same configuration and size, and each opening 16 also has the same configuration and size. Openings 14 all have a rectangular configuration, while openings 16 all have a generally truncated triangular configuration. Since each set of openings is equally spaced and similarly configured, each side edge of each opening 16 is positioned an equal distance from the adjacent side edge of an opening 14.

A cylindrical drum 17 is mounted in housing 11. In the preferred embodiment, drum 17 is also a right circular cylinder with an inside diameter corresponding to the diameter of center portion 13c. Drum 17 has an open bottom that is positioned over center portion 13c and cylindrical member 13b. Drum 17 has a circular top wall 17a. Extending through the center of top wall 17a, and secured thereto, is a drive shaft 18. The bottom end of drive shaft 18 is positioned for rotation in a bearing assembly 19 secured to the center of center portion 13c. The upper end of shaft 18 extends into a gear reduction unit 20 that is secured to side wall 12 by means of a plate 21. Gear reduction unit 20 is mounted such that shaft 18 lies along the vertical axis of both housing 11 and drum 17. When shaft 18 is rotated by gear reduction unit 20, drum 17 rotates therewith, within housing 11. It is noted that top wall 17a is located at a higher position than the top edges of openings 14 in side wall 12.

A plurality of evenly spaced, radially extending flat paddles 22 are mounted as by welding on drum 17. Each paddle 22 is formed from a flat sheet of metal and has a rectangular configuration. Each paddle 22 also lies in a plane extending through the axis of rotation of drum 17. Paddles 22 are equal in length to drum 17 so that their bottom ends are positioned closely adjacent bottom wall 13 and their top ends are positioned above the top edges of openings 14. Paddles 22 extend outwardly from drum 17 to a point closely adjacent the inner surface of side wall 12.

Drum 17 and the attached plurality of paddles 22 thus form what might be called a paddle wheel unit that is rotatable within housing 11. The outside diameter of the paddle wheel unit corresponds to the inside diameter of housing 11 so that no granular material can pass between the outer edges of paddles 22 and the inner surface of side wall 12. Further, the bottom edges of paddles 22 all lie in the same horizontal plane closely adjacent outer portion 13a of bottom wall 13 so that no material will pass therebetween.

Welded or otherwise attached to the outside surface of side wall 12 at each opening 14 is a fertilizer dispensing chute 25. Chutes 25 are designed to introduce fertilizer or other comminuted material into housing 11 through openings 14. Each chute 25 has a bottom wall portion 25a that slopes upwardly from the bottom edge of opening 14 at a sufficient angle so that fertilizer will flow by gravity downwardly through chute 25 into housing 11. Each chute 25 also includes a pair of vertically extending, parallel side wall portions 25b and 25c and a top wall portion 25d. Bottom wall portion 25a and side wall portions 25b and 25c are securely attached to the corresponding edges of opening 14 to prevent the leakage of material therebetween. Top wall portion 25d is spaced from side wall 12, however, a sufficient distance to permit the introduction of a sliding gate valve 26. Gate valve 26 is a generally rectangular piece of metal that is slightly wider than opening 14 and sufficiently long to extend a short distance above top wall portion 25d when closed. Gate valve 26 is vertically slideable in a pair of tracks 27 and 28 mounted along the vertical side edges of opening 14. Welded to the upper end of gate valve 26 is a threaded nut 29. A threaded shaft 30 is rotatably mounted by means of an L-shaped bracket 31 welded or the like to top wall portion 25d. Shaft 30 is vertically positioned and is threadedly engaged with nut 29. Secured to an upper part of shaft 30 is a circular plate 32 that is used to manually rotate shaft 30. Shaft 30 can thus be rotated in bracket 31 by means of plate 32, but shaft 30 does not change its vertical position with respect to bracket 31, when rotated. As shaft 30 is rotated, nut 29 travels either upwardly or downwardly along shaft 30 to either open or close gate valve 26.

The upper end of each chute 25 terminates in a horizontally positioned flanged portion 35. Flanged portion 35 has a plurality of bolts holes 36 formed therein for attachment to a correspondingly shaped and flanged supply conduit 37. Each supply conduit 37 leads to a storage compartment 38 in which one of the basic ingredients is stored. When gate valve 26 is opened, the material stored in compartment 38 will flow downwardly by gravity through supply conduit 37 and chute 25 into housing 11. The amount of material flowing through each chute 25 into housing 11 can thus be regulated by the positioning of gate valve 26.

To provide motive power for the rotation of the paddle wheel unit, a motor 40 is provided that is operatively connected to gear reduction unit 20 by means of a belt 41. Motor 40 can be an electric motor or an internal combustion engine. Alternatively, gear reduction unit 20 could be driven from a power take-off unit.

Mounted on bottom wall 13 under each of the openings 16 is a pivotable deflector device 43. Each deflector device 43 has a generally rectangular base 43a and a pair of parallel, triangular sides 43b and 43c extending perpendicular to base 43a. Sides 43b and 43c thereby each have a single free corner spaced from base 43a an equal distance. Mounted to the upper surface of outer portion 13a on each side of each opening 16, is a pivot member 44. Each deflector device 43 is pivotally secured to a pair of pivot members 44 by means of a rod 45 extending through the pair of pivot members 44 and through the free corners of triangular sides 43b and 43c.

Secured to the bottom of each base 43a is a generally U-shaped holding member 46. Threaded through each of the holding members 46 is a circular metal ring 47. Holding member 46 is secured to base 43a close to the inner edge of base 43a so that the weight of ring 47 tends to hold deflecting device 43 in the full line position shown in FIG. 6. In this position, material flowing from an opening 16 is deflected by base 43a toward the central axis of housing 11. As best shown in FIG. 1, the material flowing from each opening 16 is deflected by a deflector device 43 toward the center of the unit, so that material flowing from all of the openings commingles into a single stream.

If it is desired to check the material flowing from each opening 16 to determine the composition of the resulting mixture, ring 47 is lifted while being maintained in a horizontal plane so that each deflector device 43 is pivoted to the position shown in phantom in FIG. 6. In this position, material flowing from an opening 16 is deflected outwardly away from the unit where it can be collected and measured to determine the rate of flow from each opening 16.

In the preferred form of our invention, the material flowing from deflector devices 43 is collected by a hopper 49 leading to an auger 50. Auger 50, which is driven by a motor 51 carries the blended materials to a discharge spout 52. Other types of augers or elevators can of course be used in place of the one shown.

OPERATION

When motor 40 is energized, shaft 18 is rotated to rotate the paddle wheel unit including drum 17 and paddles 22. Each of the storage compartments 38 is provided with a basic ingredient that will form a certain proportion of the resulting mixture. Each gate valve 26 is adjusted by rotating shaft 30 so that a selected flow of material will pass through each opening 14 in side wall 12. The material flows into housing 11 by gravity and is collected between the spaced paddles 22.

The rotating paddle wheel unit carries the material with it until it reaches the next adjacent bottom opening 16. The material between paddles 22 then falls by gravity through the opening 16 where it is deflected by deflector device 43 into hopper 49. The speed of the paddle wheel assembly is adjusted such that all of the material collected between a pair of adjacent paddles 22 has sufficient time to flow by gravity through an opening 16 before the pair of adjacent paddles passes over the opening. In this manner, each pair of adjacent paddles 22 will fill to a level corresponding to the bottom edge of gate valve 26 as it passes each opening 14 and will be completely emptied as it passes over the next adjacent bottom opening 16.

It is noted that the distance between adjacent paddles 22 is equal to or less than the distance between adjacent edges of adjacent side and bottom wall openings. Since these edges and the paddles all lie in planes extending through the axis of rotation, this distance might be expressed as an angular distance. The purpose of this feature is to insure that at least one paddle 22 will always be positioned between adjacent side and bottom openings. In this manner, the paddle wheel unit can be stopped at any position without permitting the leakage of material through the system. In the present embodiment, four equally spaced side wall openings are used in conjunction with four equally spaced, alternate, bottom wall openings. The paddle wheel unit has 16 evenly spaced paddles.

If desired, fewer than all of the side openings 14 can be opened during the blending operation so that only two or three basic ingredients are being blended. The gate valves can be adjusted during system operation and the amount of flow through each bottom opening can be tested through the use of deflector device 43. Since housing 11 has an open top, the flow of material through the system can be visually monitored to insure that no difficulties are occurring.

In addition to its use as a stationary metering and blending device, the present invention can be mounted on a vehicle together with a suitable fertilizer spreader. The resulting mixture is then fed directly into the spreader for immediate distribution on the soil.

It is evident that the present invention provides a means for quickly and accurately metering several flows of basic granular materials to provide a single blended composition having the desired proportion of each basic material. Although we have described herein the preferred embodiment of our invention, it will be apparent that changes within the spirit and scope of the invention may be made by those skilled in the art. Therefore, we intend to be bound only by the scope of the appended claims.

We claim:
1. A fertilizer metering device, comprising:
(a) a cylindrical housing, said housing having an open a top, a bottom wall, and a side wall disposed about a vertical axis;
(b) said housing having a plurality of evenly spaced openings formed in said side wall;
(c) said bottom wall having a like plurality of evenly spaced openings formed therein, said openings in said bottom wall each being positioned midway between a pair of adjacent openings in said side wall;
(d) a cylindrical drum mounted in said housing for rotation coaxially therewith, said drum having a diameter smaller than the diameter of said housing;
(e) a plurality of evenly spaced, radially extending, flat paddles mounted on said drum, each lying in a plane extending through the axis of rotation of said drum, said paddles each having a bottom end positioned closely adjaent said bottom wall of said housing, an outer edge positioned closely adjacent the inner surface of said side wall, and a top end positioned above said openings in said side wall;
(f) a separate fertilizer dispensing chute attached to the outside surface of said side wall at each of said openings to introduce fertilizer into said housing; and
(g) means for rotating said drum and paddles mounted thereon at a predetermined, constant speed, said paddles carrying fertilizer from said openings in said side wall to said openings in said bottom wall.

2. The apparatus of claim 1 including means for controlling the flow of fertilizer from each of said chutes into said housing.

3. The apparatus of claim 2 wherein said means for controlling the flow of fertilizer includes a sliding gate valve mounted on said side wall across each said opening therein, a threaded nut fixedly mounted on each said gate valve, and a rotatable threaded screw mounted on said chute engageable with said nut to position said gate valve.

4. The apparatus of claim 1 including a pivotable deflector device mounted on said bottom wall under each of said bottom wall openings, said device having a generally rectangular base and a pair of parallel, triangular sides extending perpendicular to said base, said sides thereby each having a single corner spaced from said base, said corners being pivotally attached to opposite sides of said bottom wall openings so that fertilizer flowing therefrom is deflected by said base.

5. The apparatus of claim 4 including a ring member attached to the base of each of said deflector devices to pivot said devices to change the direction in which said fertilizer is deflected.

6. Apparatus for metering the flows of a plurality of comminuted materials, comprising:
(a) a housing having a continuous side wall and a bottom wall, said side wall having a circular cross section;

(b) means including a plurality of adjustable spout means for introducing a like plurality of comminuted materials into said housing through said side wall;

(c) a plurality of openings in said bottom wall, said openings being laterally offset with respect to said spout means;

(d) means including a paddle wheel unit rotatably mounted in said housing to carry said comminuted materials from said spout means to said openings in said bottom wall when rotating and to block the gravity flow of said materials from said spout means to said openings when stationary; and (e) means for rotating said paddle wheel unit at a relatively constant speed.

7. The apparatus of claim 6 wherein said housing is a right circular cylinder having a vertically positioned axis of symmetry, wherein said spout means includes a plurality of evenly spaced apart openings formed in said side wall, and wherein said openings in said bottom wall are each spaced midway between a pair of openings in said side wall.

8. The apparatus of claim 7 wherein said paddle wheel unit includes rotatable drive shaft means coaxially mounted in said cylindrical housing, and a plurality of spaced flat paddles extending radially from said drive shaft means and terminating closely adjacent said side and bottom walls to prevent the passage of said material therebetween.

9. The apparatus of claim 8 wherein said paddles are spaced apart a distance less than the distance between adjacent side wall and bottom wall openings.

10. The apparatus of claim 6 including conveyor means mounted beneath said openings in said bottom wall to carry away said comminuted materials being discharged from said housing.

References Cited

UNITED STATES PATENTS

| | | | |
|---|---|---|---|
| 292,346 | 1/1884 | Nafziger | 73—218 |
| 308,001 | 11/1884 | Sommer | 73—218 |
| 925,390 | 6/1909 | Royer | 73—218 |

RICHARD C. QUEISSER, Primary Examiner

J. K. LUNSFORD, Assistant Examiner

U.S. Cl. X.R.

222—132